(12) United States Patent
Von Haden et al.

(10) Patent No.: US 8,296,399 B2
(45) Date of Patent: Oct. 23, 2012

(54) CONNECTING GALLERIES TO DYNAMIC SERVER-HOSTED CONTENT

(75) Inventors: Kyle Matthew Von Haden, Mill Creek, WA (US); Sang Ju Lee, Sammamish, WA (US); Dheeraj Sarpangal, Redmond, WA (US); Peter Michael Woods, Redmond, WA (US); Xiaomeng Zhao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/503,519

(22) Filed: Jul. 15, 2009

(65) Prior Publication Data

US 2011/0016194 A1 Jan. 20, 2011

(51) Int. Cl.
  *G06F 15/16* (2006.01)
  *G06F 15/177* (2006.01)
  *G06F 9/445* (2006.01)

(52) U.S. Cl. ........ 709/219; 709/203; 709/220; 717/168; 717/171

(58) Field of Classification Search .................. 709/203, 709/217–224; 717/168–173; 715/200–203
See application file for complete search history.

(56) References Cited

U.S. PATENT DOCUMENTS

| | | | | |
|---|---|---|---|---|
| 6,522,770 | B1 * | 2/2003 | Seder et al. .................. | 382/100 |
| 6,944,857 | B1 * | 9/2005 | Glaser et al. .................. | 717/173 |
| 7,281,245 | B2 * | 10/2007 | Reynar et al. ................. | 717/173 |
| 7,844,963 | B2 * | 11/2010 | Pitzel et al. ................... | 717/173 |
| 2004/0267940 | A1 | 12/2004 | Dideriksen et al. | |
| 2005/0097543 | A1 * | 5/2005 | Hirayama ...................... | 717/168 |
| 2005/0278625 | A1 * | 12/2005 | Wessling et al. ............... | 715/527 |
| 2006/0059481 | A1 * | 3/2006 | Smith et al. .................... | 717/173 |
| 2006/0174242 | A1 * | 8/2006 | Zhu et al. ....................... | 717/172 |
| 2008/0155534 | A1 * | 6/2008 | Boss et al. ...................... | 717/178 |
| 2008/0201705 | A1 * | 8/2008 | Wookey ........................ | 717/175 |
| 2008/0201707 | A1 | 8/2008 | Lavery et al. | |
| 2008/0288629 | A1 | 11/2008 | Fisher, III et al. | |
| 2009/0043907 | A1 | 2/2009 | Peterson et al. | |
| 2009/0293051 | A1 * | 11/2009 | Krywaniuk ................... | 717/173 |
| 2010/0182070 | A1 * | 7/2010 | Chang .......................... | 327/415 |

OTHER PUBLICATIONS

Actipro Ribbon for WPF—WindowsClient.net, http://windowsclient.net/downloads/folders/controlgallery/entry3922.aspx, 4 pages (Date Printed May 15, 2009).
Deploying Smart Client Applications, http://nplusl.org/articles/deploying-smart-client-applications/, 5 pages (Date Printed May 15, 2009).
Screenshot Gallery, http://www.indigorose.com/trueupdate/screenshots-true-update/, 9 pages (Date Printed May 15, 2009).
Working with Galleries, http://msdn.microsoft.com/en-us/library/dd742868(VS.85,printer).aspx, 14 pages (Date Printed May 15, 2009).

* cited by examiner

*Primary Examiner* — Joshua Joo
(74) *Attorney, Agent, or Firm* — Merchant & Gould (57) ABSTRACT

Application gallery connections to dynamic server-hosted content may be provided. An application may be instantiated on a client device. Upon loading, the application may connect to an available content server and download a content manifest. An application setting, such as a privacy setting or an administrative restriction may prevent connections to the content server; otherwise the application may determine whether the content manifest lists any new content for download. New content may be downloaded and made available to users of the application. The application may also determine whether any previously downloaded content is out of date according to the content manifest and remove unused content.

20 Claims, 4 Drawing Sheets

CONNECTING GALLERIES TO DYNAMIC SERVER-HOSTED CONTENT

BACKGROUND

Dynamic Server-Hosted Content Connection is a process for delivering dynamic content to a variety of client applications. In some situations, providing web-based content can be difficult to synchronize and can negatively impact application performance. For example, waiting to download web-based content until a user requests access to it can delay the user while re-downloading already retrieved content can waste storage resources. The conventional strategy is simply to download all new content without regard to synchronization or usage behavior. This strategy can leave out-of-date content stored on a user's computer or remove components that a user may rely on.

SUMMARY

Dynamic server-hosted content connections may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Application gallery connections to dynamic server-hosted content may be provided. An application may be instantiated on a client device. Upon loading, the application may connect to an available content server and download a content manifest. An application setting, such as a privacy setting or an administrative restriction may prevent connections to the content server; otherwise the application may determine whether the content manifest lists any new content for download. New content may be downloaded and made available to users of the application. The application may also determine whether any previously downloaded content is out of date according to the content manifest and remove unused content.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Dynamic server-hosted content connections may be provided. Consistent with embodiments of the present invention, applications may connect to an online service to download services such as updates, functionality, and/or additional content. For example, a word processing application may download new fonts or document templates. A presentation application may download services such as new slide presentation themes or projector configurations. Each application may maintain a content library synchronized with the service download library. This may enable the application to download new content and remove unused and/or out of date content.

Figure 1:
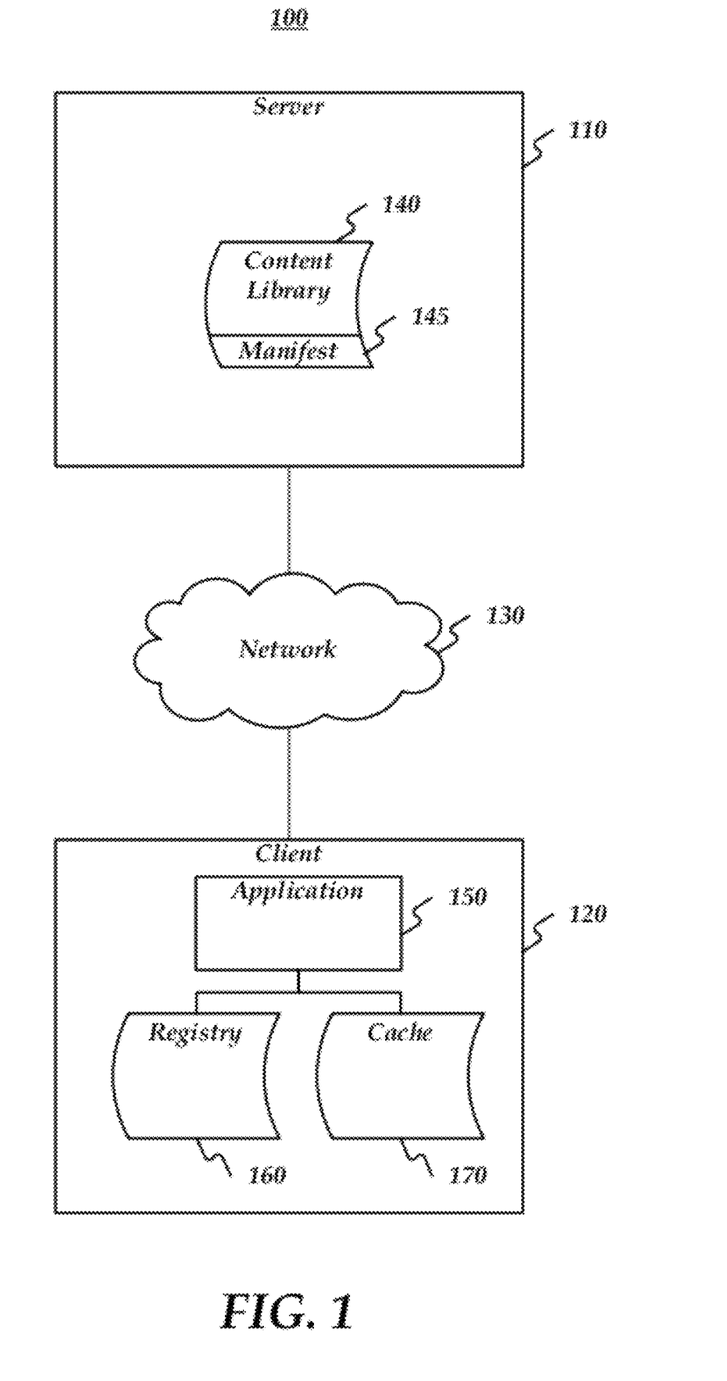
FIG. 1 is a block diagram of an operating environment.

FIG. 1 is a block diagram of an operating environment 100 for connecting application galleries to server-hosted content. Operating environment 100 may comprise a server 110 and a client 120 connected via a network 130. Server 110 and/or client 120 may comprise, for example, a computing device 400 as described in greater detail below with respect to FIG. 4 while network 130 may comprise a private network and/or a publicly accessible network such as the Internet. Server 110 may comprise a hosted content library 140 and a content manifest 145. Consistent with embodiments of the invention, content library 140 may comprise a file store and/or a database storing downloadable application content individually and/or in packages. For example, one element of downloadable content may comprise a set of slideshow presentation themes for use in a presentation application. Another element of downloadable content may comprise a language-specific spell-checking library for a word processing application.

Client 120 may comprise an application 150, a system registry 160, and a content cache 170. Content cache 170 may be stored on a memory storage associated with client 120 and may be divided among multiple locations within a file system. For example, content associated with an original installation of application 150 may be stored in a first directory and newly downloaded content may be stored in a second directory. Multiple applications may operate on client 120 and each may be associated with one and/or more content locations. For example, downloaded content associated with a presentation application and a word processing application may be stored in the same directory while each application may store originally installed content in an application specific directory.

Figure 2:
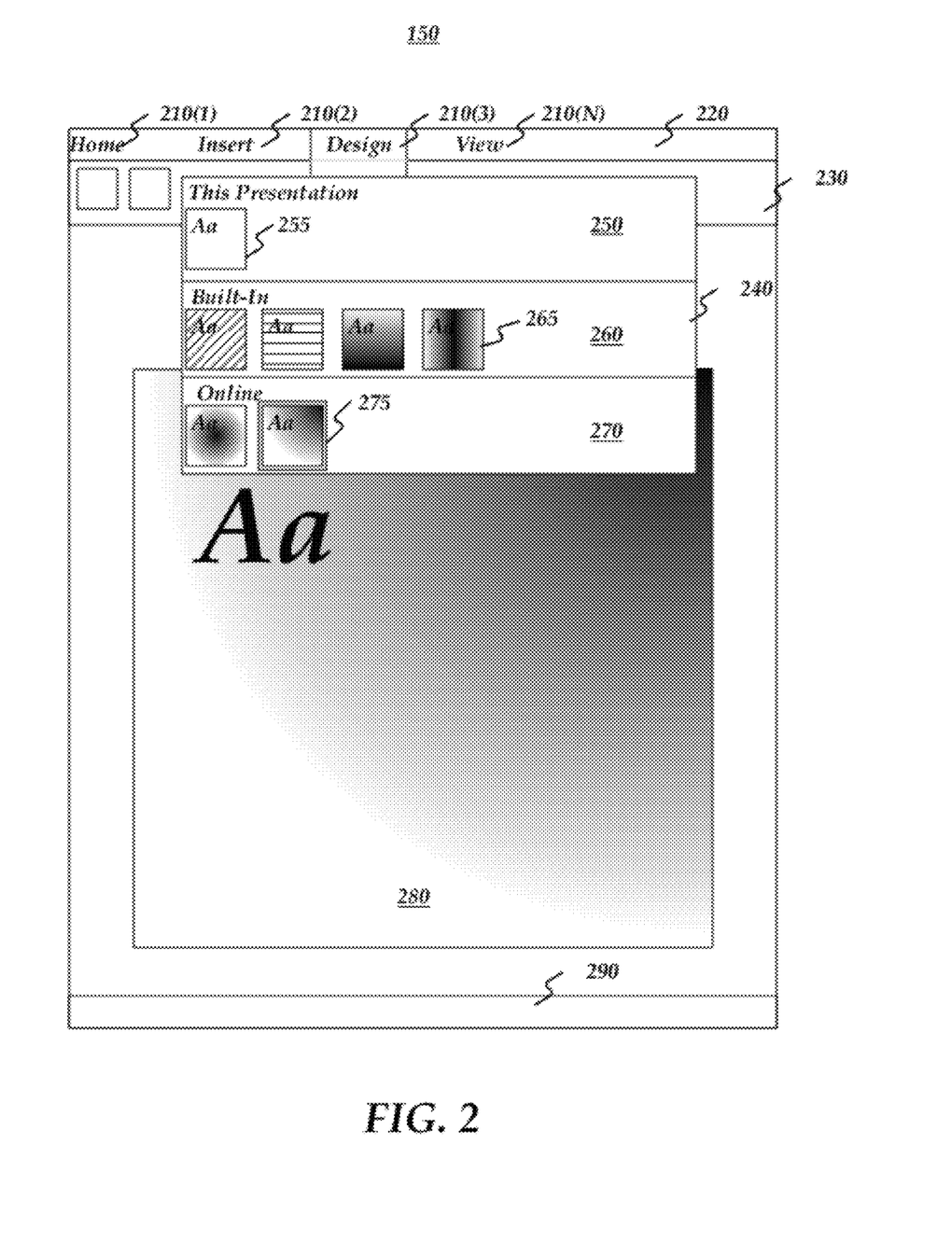
FIG. 2 is a diagram illustrating an application using a content library.

FIG. 2 is a diagram illustrating application 150 using a content library. Application 150 may comprise a plurality of menu items 210(1) through 210(N) displayed in a menu bar 220. Selection of one of the plurality of menu items may cause application 150 to display a plurality of user interface buttons in a ribbon menu 230. Selection of one of the plurality of menu items, such as menu item 210(3), may display a preview gallery 240. Application 150 may further comprise a document 280 and a status bar 290. Preview gallery 240 may comprise a current document section 250 comprising a currently active content element 255, a built-in section 260 comprising a plurality of content elements installed as part of an original installation of application 150 such as a built-in content element 265, and an online section 270 comprising a plurality of downloaded content elements such as a downloaded content element 275.

For example, application 150 may comprise a presentation application operative to open, edit, modify, display, and/or save document 280. Menu item 210(3) may comprise a design menu operative to open preview gallery 240 comprising a plurality of slide presentation themes (e.g. a collection of visual elements such as background images, colors, fonts, and/or slide text layouts). Selection of one of the content elements in preview gallery 240 may be operative to apply the selected content element to application 280. For example, selection of downloaded content element 275 comprising a downloaded theme may update the display of document 280 to reflect the selected theme. A user of application 150 may then exit the menu, leaving downloaded content element 275 applied to document 280 or reverting back to currently active content element 255.

Figure 3:
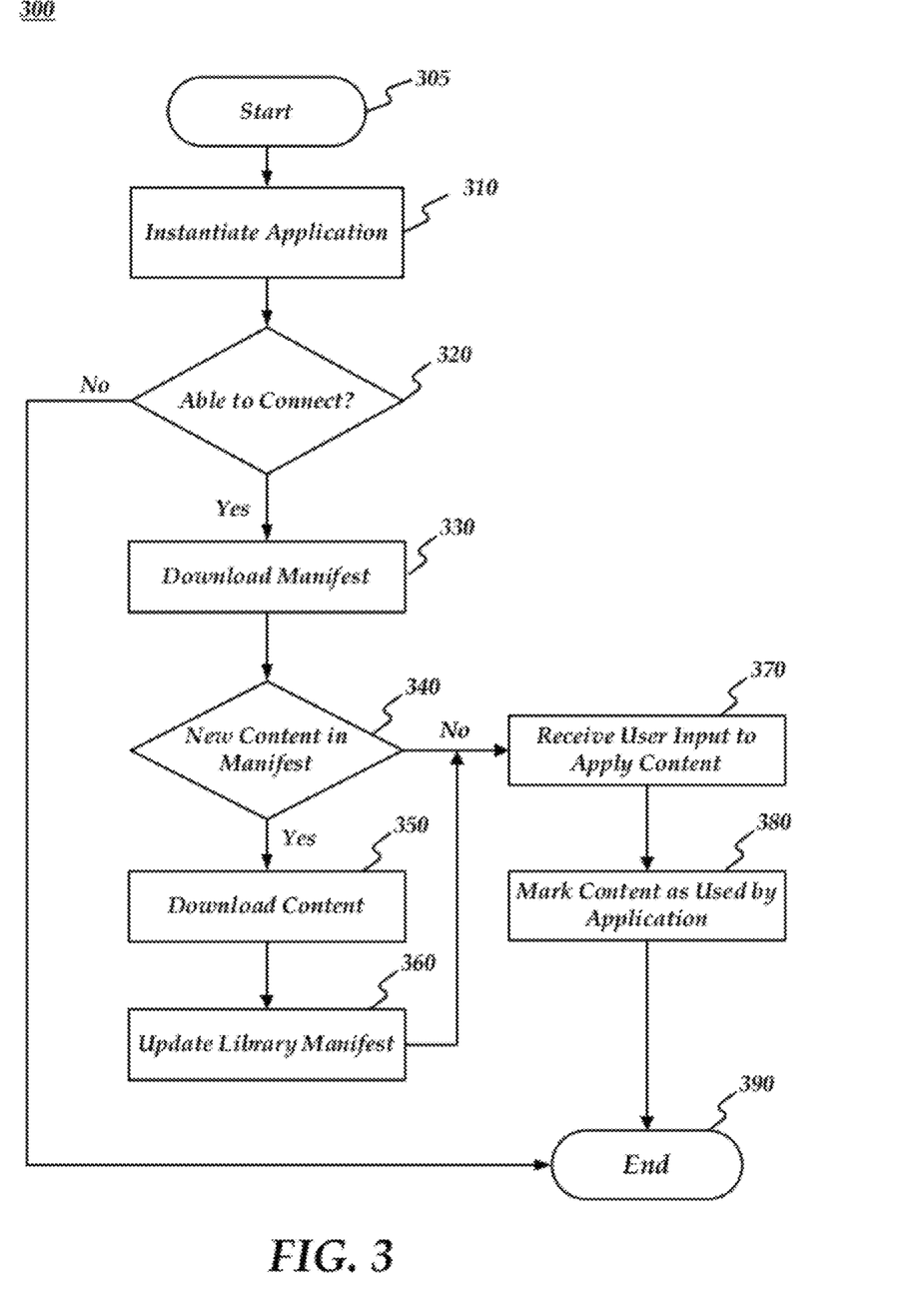
FIG. 3 is a flow chart of a method for providing dynamic server-hosted content connections.

FIG. 3 is a flow chart setting forth the general stages involved in a method 300 consistent with an embodiment of the invention for providing dynamic application content. Method 300 may be implemented using computing device 400 as described in more detail below with respect to FIG. 4. Ways to implement the stages of method 300 will be described in greater detail below. Method 300 may begin at starting block 305 and proceed to stage 310 where computing device 400 may instantiate an application. For example, application 150 may comprise a plurality of content elements stored in a file cache associated with application 150. The content elements may comprise elements stored as part of an original installation of application 150 and/or previously downloaded content elements. Application 150 may load a list of content elements available to application 150. The content element list may comprise a library manifest, an entry (and/or plurality of entries) in registry 160 and/or content index file in cache 170. Consistent with embodiments of the invention, registry 160 may comprise a database which stores settings and options for a plurality of applications such as application 150. Registry 160 may also comprise hardware and/or user preference data and settings.

After instantiating the application in stage 310, method 300 may advance to stage 320 where computing device 400 may determine whether the application can connect to a remote content server. For example, client 120 may determine whether a connection to server 110, such as network 130 is active and available. Consistent with embodiments of the invention, application 150 may determine whether an application setting permits the system to connect to the remote content server. For example, a user privacy setting may be enabled by a user accessing application 150 and/or an administrator of client 120.

The setting may also comprise a demographic setting, such as a user's geographic location. The setting may prohibit client 120 from accessing network 130 in general, server 110 specifically, and/or content servers associated with application 150. Client 120 may also determine whether accessing server 110 may violate a legal and/or policy restriction stored on client 120.

If, at stage 320, computing device 400 determines that the application cannot connect to a content server, method 300 may end at stage 390. Otherwise, method 300 may advance to stage 330 where computing device 400 may download a content manifest from the content server. The content manifest may comprise a list of content elements available for download for application 150 and locations, such as Uniform Resource Locators (URLs) for each of the content elements. The URLs for the content elements may comprise a plurality of different servers than content server 110 and may also be connected to network 130.

Consistent with embodiments of the invention, computing device 400 may first download a connectivity manifest from a predefined location. The connectivity manifest may comprise one and/or more location URLs for the content manifest. These location URLs may comprise a plurality of content servers providing the same and/or different content manifests. For example, the connectivity manifest may provide a plurality of mirroring locations for the content manifest and/or a plurality of locations for different content manifests associated with different application content.

Another setting that may prevent connection at stage 320 may comprise a configurable time duration within which application 150 may not reconnect to content server 110. For example, after application 150 connects once, the setting may prevent application 150 from connecting again for a given period, such as 24 hours. Application 150 may, for example, determine whether a previous content manifest was downloaded and, if so, a time at which the previous content manifest was downloaded. If no previous content manifest had been downloaded or if the timestamp on the previous content manifest is greater than the setting's time period, method 300 may continue as described. Otherwise, method 300 may end at stage 390.

Further consistent with embodiments of the invention, content server 110 may comprise a plurality of content manifests. For example, content server 110 may store content manifests for a plurality of applications other than and/or in addition to application 150. Content server 110 may also store multiple content manifests for application 150, such as language and/or region specific manifests. Client 120 may download any and/or all manifests associated with application 150. For example, client 120 may download a content manifest of English language content elements when application 150 is configured to operate in English but may download a content manifest of German language content elements when application 150 is configured to operate in German.

From stage 330, where computing device 400 downloaded the content manifest, method 300 may advance to stage 340 where computing device 400 may determine whether the content manifest comprises any new content. For example, client 120 may synchronize the content elements within the downloaded content manifest with a library manifest associated with application 150. The library manifest associated with application 150 may comprise an index file of content stored on a memory storage of client 120, such as cache 170. Consistent with embodiments of the invention, content existing on client 120 may be indexed in the database of registry 160. The content listed in registry 160 may comprise content elements installed as part of an original installation of application 150 and/or previously downloaded content elements from content server 110 and/or other content servers indexed in the content manifest.

If, at stage 340, computing device 400 determines that the content manifest lists at least one new content element not currently present on computing device 400, method 300 may advance to stage 350 where computing device 400 may download the new content element. For example, the content manifest may list two slideshow presentation themes for use in a presentation application. Client 120 may determine that only one of the slideshow themes has previously been downloaded and may download the other theme. When the user then accesses a themes menu selection in application 150, the newly downloaded theme may be available to the user, as in preview gallery 240.

Method 300 may then advance to stage 360 where computing device 400 may update the list of content currently available on computing device 400. For example, client 120 may add the newly downloaded content element to a local library manifest and/or update registry 160 to indicate that the content element has been downloaded.

After updating the library manifest with the newly downloaded content element(s) at stage 360, or after determining that no new content is available for download at stage 340, method 300 may advance to stage 370 where computing device 400 may receive a user input to apply at least one downloaded content element. For example, a user may select one of the downloaded content elements from online section 270. The downloaded content element may then be applied to document 280.

From stage 370, where computing device 400 applied the content, method 300 may advance to stage 380 where computing device 400 may mark the applied content as used by an application. For example, client 120 may move the used content element from a location on a file system of client 120 where the content element was downloaded to a different location on the file system. For another example, client 120 may update an entry in the library manifest and/or registry 160 to indicate that the downloaded content element has been used. A user may then remove the downloaded content if they choose, but the registry setting and/or library manifest may prevent the content from being re-downloaded. Method 300 may then end at stage 390.

Consistent with embodiments of the invention, for content that is not in the downloaded content manifest but is in the library manifest and/or registry 160, the content may be deleted from the user's machine unless the content has been marked as having been used by application 150. When a user uses downloaded content, the content element may be moved to a folder within a data directory associated with application 150 to prevent removal of the content element.

An embodiment consistent with the invention may comprise a system for providing dynamic application content. The system may comprise a memory storage and a processing unit coupled to the memory storage. The processing unit may be operative to instantiate an application on a client device, retrieve a manifest associated with available content, determine whether the manifest identifies at least one content element not available on the client device, and in response to determining that the at least one content element is not available on the client device, download the at least one content element. If the system cannot connect in order to download the content manifest, the application may instantiate and provide access to content elements already available on the system.

Another embodiment consistent with the invention may comprise a system for providing dynamic application content. The system may comprise a memory storage and a processing unit coupled to the memory storage. The processing unit may be operative to instantiate an application, contact a content server associated with the application, retrieve a content manifest from the content server, and compare the content manifest from the content server with content already stored on the system.

Yet another embodiment consistent with the invention may comprise a system for providing dynamic application content. The system may comprise a memory storage and a processing unit coupled to the memory storage. The processing unit may be operative to instantiate an application comprising a plurality of content elements stored in a file cache associated with the application. The system may then determine whether the application can connect to a remote content server and, if so, download a content manifest from the remote content server comprising content elements associated with the application and a download location associated with each of the content elements. The system may then determine whether the content manifest comprises at least one new content element available for download, download the at least one new content element, and update the content library with the at least one new content element. The system may also receive an input to a user interface element operative to apply the at least one new content element to a document, apply the at least one new content element to the document, and mark the at least one new content element to the document as used by the application.

Figure 4:
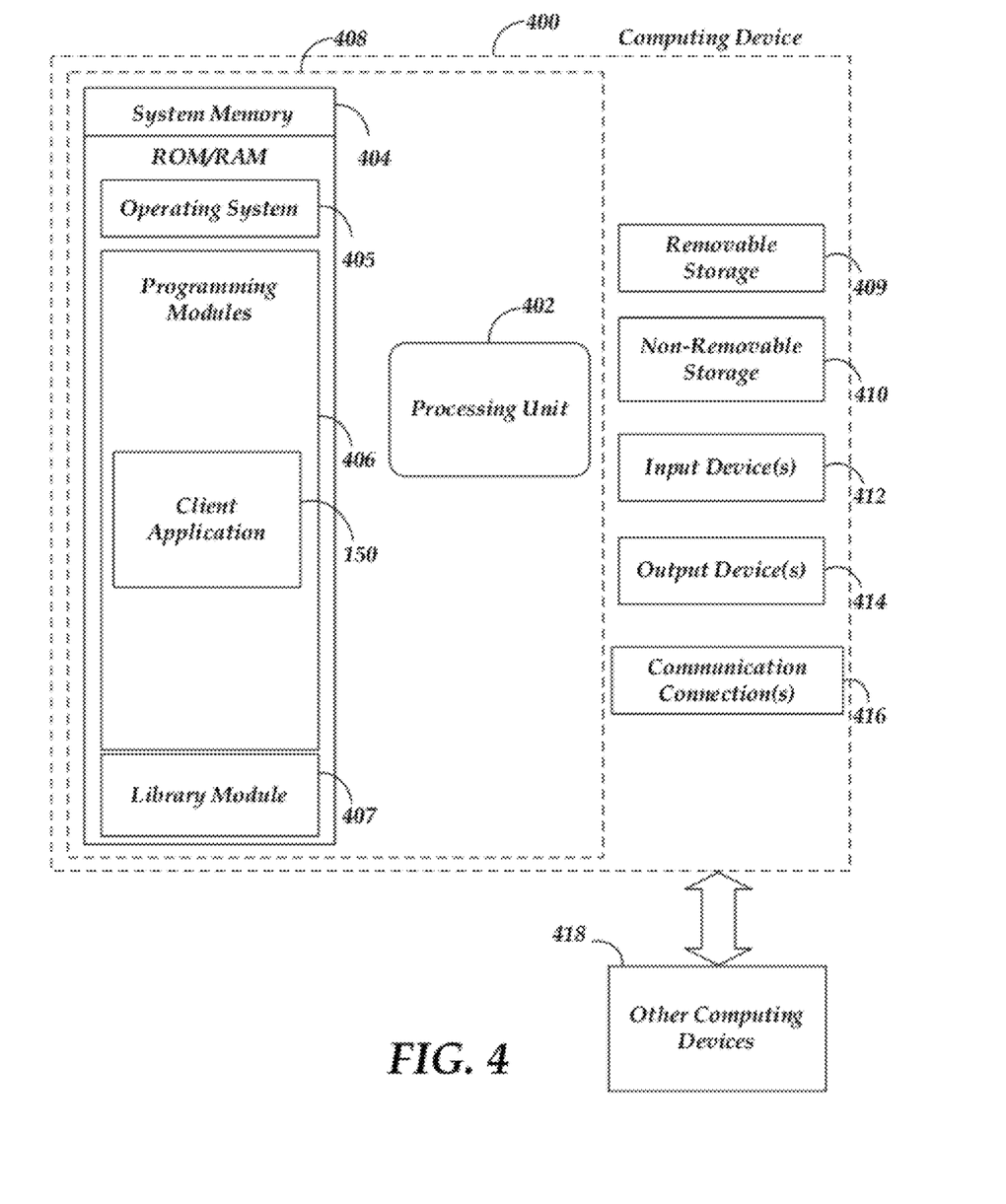
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a library manifest module 407. Operating system 405, for example, may be suitable for controlling computing device 400's operation. In one embodiment, programming modules 406 may include client application 150. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. client application 150) may perform processes including, for example, one or more method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing dynamic application content, the method comprising:
    instantiating an application on a client device;
    retrieving a manifest associated with available content, the retrieved manifest comprising specific content which is downloaded by the client device based on a configuration, from among a plurality of configurations, of the application, the retrieved manifest comprising at least a region specific manifest, the configuration, from among the plurality of configurations, comprising at least a region specific operation for the application;
    determining whether the manifest identifies at least one content element not available on the client device; and
    in response to determining that the at least one content element is not available on the client device, downloading the at least one content element;
    displaying a preview gallery in the application comprising a plurality of simultaneously displayed sections, the plurality of simultaneously displayed sections comprising a first section comprising a currently active content element, a second section comprising at least one content element installed as part of an original installation of the application and a third section comprising the downloaded at least one content element.

2. The method of claim 1, wherein the manifest comprises at least one content element and a download location for the at least one content element.

3. The method of claim 2, wherein the manifest is retrieved from a first remote server and the download location for the at least one content element comprises a second remote server.

4. The method of claim 1, further comprising:
    determining whether an application setting permits the application to retrieve the manifest; and
    in response to determining that the application setting does not permit the application to retrieve the manifest, instantiating the application with a plurality of content elements already available on the client device.

5. The method of claim 4, wherein the application setting comprises an administrative policy setting.

6. The method of claim 4, wherein the application setting comprises a user privacy setting.

7. The method of claim 4, wherein the application setting comprises a geographic location setting.

8. The method of claim 1, further comprising:
    determining whether the client device comprises at least one content element not listed in the manifest.

9. The method of claim 8, further comprising:
    in response to determining that the client device comprises at least one content element not listed in the manifest, determining whether the at least one content element not listed in the manifest has been used by the application.

10. The method of claim 9, wherein determining whether the at least one content element not listed in the manifest has been used by the application comprises determining whether the at least one content element not listed in the manifest has been moved to a file location associated with the application.

11. The method of claim 9, wherein determining whether the at least one content element not listed in the manifest has been used by the application comprises determining whether a registry setting associated with the at least one content element not listed in the manifest indicates that the at least one content element not listed in the manifest has been used by the application.

12. The method of claim 9 further comprising:
    in response to determining that the at least one content element not listed in the manifest has been used by the application, saving the at least one content element not listed in the manifest that has been used by the application.

13. The method of claim 9 further comprising:
    in response to determining that the at least one content element not listed in the manifest has not been used by the application, removing the at least one content element not listed in the manifest.

14. The method of claim 1, further comprising receiving a selection of the downloaded at least one content element from the third section to apply the downloaded at least one content element to a document associated with the application, the document further being simultaneously displayed in the application with the preview gallery.

15. A computer-readable storage medium which stores a set of instructions which, when executed by a computing device, performs a method for providing dynamic application content, where the computer-readable storage medium does not include a transmission signal, the method executed by the set of instructions comprising:
    instantiating an application on a client;
    contacting a content server associated with the application;
    retrieving a content manifest from the content server, the retrieved content manifest comprising specific content which is downloaded by the client based on a configuration, from among a plurality of configurations, of the application, the retrieved content manifest comprising at least a region specific manifest, the configuration, from among the plurality of configurations, comprising at least a region specific operation for the application; and
    comparing the content manifest from the content server with a list of content elements on the client;
    downloading at least one new content element from the content server, wherein the at least one new content element is listed in the content manifest from the content server and not listed in the list of content elements on the client; and
    displaying a preview gallery in the application comprising a plurality of simultaneously displayed sections, the plurality of simultaneously displayed sections comprising a first section comprising a currently active content element, a second section comprising at least one content element installed as part of an original installation of the application and a third section comprising the downloaded at least one new content element.

16. The computer-readable storage medium of claim 15, wherein the method executed by the set of instructions further comprises:
    determining whether at least one content element listed in the list of content elements on the client is not listed in the content manifest from the content server; and
    in response to determining that the at least one content element listed in the list of content elements on the client is not listed in the content manifest from the content server, determining whether the at least one content element has been used by the application.

17. The computer-readable storage medium of claim 16, wherein the method executed by the set of instructions further comprises:

in response to determining that the at least one content element has not been used by the application, deleting the at least one content element.

18. The computer-readable storage medium of claim 15, wherein the content manifest from the content server comprises a plurality of content elements associated with a plurality of download servers.

19. The computer-readable storage medium of claim 15, wherein the method executed by the set of instructions further comprises receiving a selection of the downloaded at least one new content element from the third section to apply the downloaded at least one new content element to a document associated with the application, the document further being simultaneously displayed in the application with the preview gallery.

20. A system for providing dynamic application content, the system comprising:

a memory storage; and a processing unit coupled to the memory storage, wherein the processing unit is operative to:

instantiate an application, wherein the application comprises a plurality of content elements stored in a file cache associated with the application;

determine whether the application can connect to a remote content server, wherein being operative to determine whether the application can connect to the remote content server comprises at least one of the following: being operative to determine whether an available network connection is active between the system and the remote content server and being operative to determine whether an application setting permits the system to connect to the remote content server;

in response to determining that the application can connect to the remote content server, downloading a content manifest from the remote content server wherein the retrieved content manifest comprises at least a region specific manifest which is downloaded by the system based on whether the application is configured for at least a region specific operation, the application being configured for a plurality of operations;

determine whether the content manifest comprises at least one new content element available for download, wherein being operative to determine whether the content manifest comprises at least one new content element available for download comprises being operative to determine whether a content library associated with the application does not comprise at least one of a plurality of content elements of the content manifest and wherein the content library comprises at least one previously downloaded content element associated with the application;

in response to determining that the at least one new content element is available for download:

download the at least one new content element, and update the content library with the at least one new content element;

receive an input to at least one user interface element operative to apply the at least one new content element to a document associated with the application;

display a preview gallery in the application comprising a plurality of simultaneously displayed sections, the plurality of simultaneously displayed sections comprising a first section comprising a currently active content element, a second section comprising at least one content element installed as part of an original installation of the application and a third section comprising the downloaded at least one new content element;

apply the at least one new content element to the document; and mark the at least one new content element to the document as used by the application, wherein being operative to mark the at least one new content element to the document as used by the application comprises at least one of the following: moving the at least one new content element to a new storage location and updating at least one registry setting associated with the content library.

\* \* \* \* \*